(12) United States Patent
Jiao

(10) Patent No.: US 7,144,141 B2
(45) Date of Patent: Dec. 5, 2006

(54) SELF-AIM VEHICLE LIGHT DEVICE

(75) Inventor: Jianzhong Jiao, Novi, MI (US)

(73) Assignee: North American Lighting, Inc., Farmington Hills, MI (US)

( * ) Notice: Subject to any disclaimer, the term of this patent is extended or adjusted under 35 U.S.C. 154(b) by 0 days.

(21) Appl. No.: 10/893,169

(22) Filed: Jul. 16, 2004

(65) Prior Publication Data

US 2006/0013005 A1  Jan. 19, 2006

(51) Int. Cl.
*B60Q 1/06* (2006.01)
(52) U.S. Cl. ...................... 362/465; 362/464; 362/512; 362/323
(58) Field of Classification Search ................ 362/465, 362/464, 276, 351, 280, 323, 512
See application file for complete search history.

(56) References Cited

U.S. PATENT DOCUMENTS

| | | | |
|---|---|---|---|
| 1,217,199 A | 2/1917 | Matheson et al. | |
| 1,360,841 A | 11/1920 | Whiting | |
| 1,490,676 A | 4/1924 | Miller | |
| 1,678,170 A | 7/1928 | Tjaden | |
| 1,774,413 A * | 8/1930 | Bendixen | 362/276 |
| 1,785,332 A | 12/1930 | Thom | |
| 2,445,835 A | 7/1948 | LeClair | |
| 2,606,999 A | 8/1952 | Tostevin | |
| 2,851,586 A | 9/1958 | De Lorean | |
| 2,885,565 A | 5/1959 | Davis | |
| 3,385,961 A | 5/1968 | Lemberger | |
| 3,636,343 A | 1/1972 | Martin | |
| 3,646,339 A | 2/1972 | Yssel | |
| 3,697,741 A | 10/1972 | Yssel | |
| 3,728,538 A | 4/1973 | Bailly | |
| 3,846,627 A | 11/1974 | Chastain | |
| 3,939,339 A | 2/1976 | Alphen | |
| 4,142,228 A | 2/1979 | Kumagai et al. | |
| 4,223,375 A | 9/1980 | Alphen | |
| 4,336,571 A | 6/1982 | Marchand | |
| 4,796,169 A * | 1/1989 | Shemitz | 362/282 |
| 5,057,983 A * | 10/1991 | Ulrich, Sr. | 362/514 |
| 5,158,352 A * | 10/1992 | Ikegami et al. | 362/539 |
| 5,195,816 A | 3/1993 | Moss, Jr. et al. | |
| 5,373,424 A | 12/1994 | Ishikawa | |
| 5,896,011 A | 4/1999 | Zillgitt | |
| 6,186,651 B1 * | 2/2001 | Sayers et al. | 362/512 |

\* cited by examiner

*Primary Examiner*—Renee Luebke
*Assistant Examiner*—Robert May
(74) *Attorney, Agent, or Firm*—McDonnell Boehnen Hulbert & Berghoff LLP

(57) ABSTRACT

A self-aim light device. The light device includes a rotating light shield pivotally coupled to an axis. The light shield could include a mass on one end such that gravitational forces control movement of the light shield around a pivot point. The light device may be positioned within a vehicle and the light shield allows for self-aiming of a light output to conform to movement of the vehicle due to a gravitational force.

11 Claims, 5 Drawing Sheets

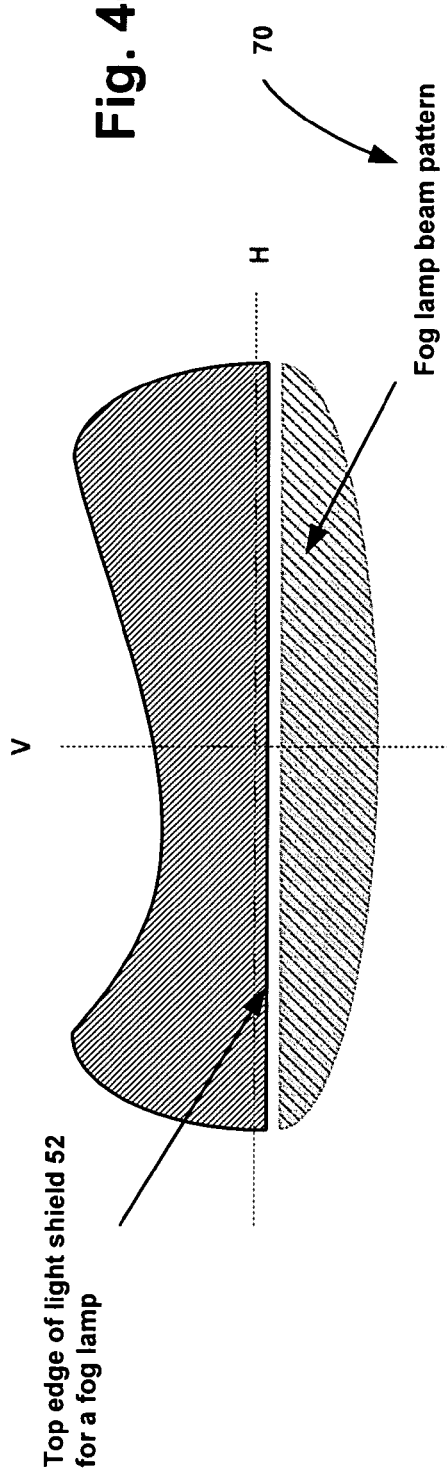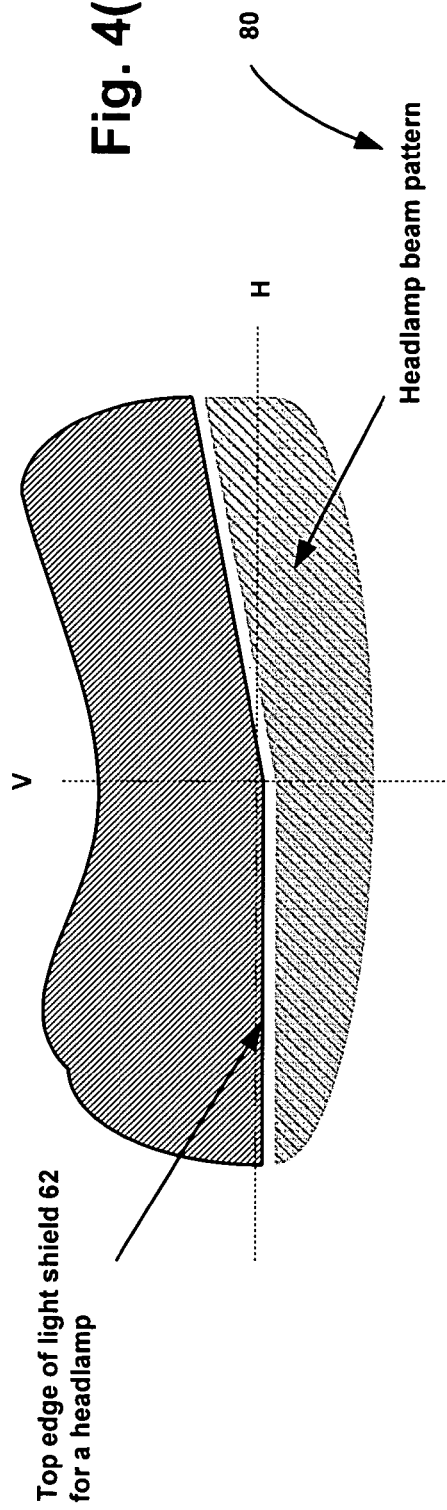

SELF-AIM VEHICLE LIGHT DEVICE

FIELD OF INVENTION

The present invention relates generally to a lamp assembly. More particularly, the present invention relates to a self-aim vehicle light device, such as an automotive headlamp that includes a freely-rotational light shield to direct light beams of the headlamp.

BACKGROUND

Certain typical vehicle lighting devices, such as low beam headlamps and fog lamps, provide forward illumination when driving. These lamps are required to be properly aimed to avoid glare light for on-coming vehicle drivers. A traditional approach to design a projector type headlamp or fog lamp is to use a light shield fixed inside the lighting device. The light shield blocks a portion of the light emitted from the lamp to prevent glare so that the light beam can meet certain performance or regulatory requirements.

Unfortunately, however, headlamps are typically affixed to the vehicle and the direction of the light beam is determined by the facing of the vehicle body. Therefore, when certain vehicles, e.g., motorcycles, are driving on a curved road or making turns, the light beam tilts with the vehicle and, thus is not properly aimed for direct forward illumination. Because the light shield is usually fixed in relation to the lamp, the light shield will direct the light beam in the direction in which the vehicle is facing, not in the direction of the curved road.

Some light devices vertically adjust light beam distribution by rotating the light shield using a mechanical or an electrical device, such as by way of an electric motor. This requires use of a complicated supporting structure, and also limits the adjustment of the light beam in the vertical direction, which fails to provide a desired light distribution when a vehicle makes a turn. Moreover, some other known devices provide a horizontal aiming feature (U.S. Pat. No. 3,939,339), with an aiming device mounted outside of the light module. Therefore, in these types of know devices, the entire light module or lamp assembly must be moved to achieve the aiming location.

SUMMARY

A self-aim vehicle lamp device is provided. In an exemplary embodiment, a light device comprises a housing, a light source positioned within the housing, and a light shield positioned within the housing. The light shield is positioned such that gravitational force directs the light shield so that a light beam emitted from the light source is horizontally aimed by the light shield. Therefore, it is possible to change the direction of light beams emitted from the light source without a need for certain motorized components. The present vehicle light device is a self-aiming device due to gravitational forces.

In another respect, an exemplary embodiment may take the form of an automotive headlamp or, alternatively, a fog lamp. The automotive headlamp or fog lamp includes a housing, a light source coupled to the housing, and a rotating light shield coupled to the housing. In turn, a light beam emitted by the light source is self-aimed by the light shield due to movement of the light shield by a gravitational force.

These as well as other features and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 4(a) illustrates an example of a light distribution for the embodiment illustrated in FIG. 3(a);

FIG. 4(b) illustrates an example of a light distribution for the embodiment illustrated in FIG. 3(b)

DETAILED DESCRIPTION

In an exemplary embodiment, a light device is provided that includes a rotating light shield. The light shield can be self-aimed by gravitational force. The light shield is designed such that it has a center of gravity that is generally located below the shield's pivot point or its rotational center. When a vehicle, such as an automobile, motorcycle, bicycle, or the like, in which the light device is provided is tilted, such as while moving on a curved road or making a turn, gravitational force tends to pull the light shield downward so that a light beam is aimed horizontally.

Figure 1:
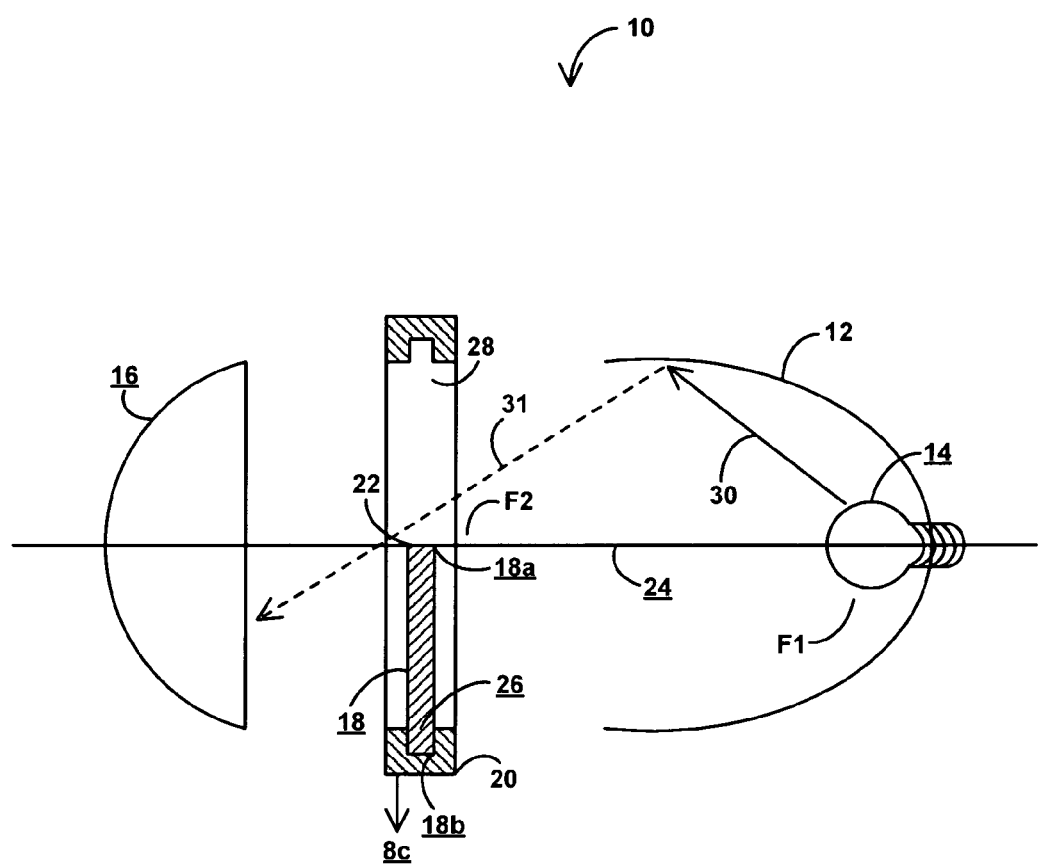
FIG. 1 is a side view of one embodiment of a light device.

Referring now to the figures, and more particularly to FIG. 1, a side view of one embodiment of a light device 10 is illustrated. It should be understood that the light device 10 illustrated in FIG. 1 and other arrangements described herein are set forth for purposes of example only, and other arrangements and elements can be used instead and some elements may be omitted altogether, depending on manufacturing, design, and/or consumer preferences.

The light device 10 includes a reflector or housing 12 and a light source 14 positioned within the housing 12. The light device 10 further includes a projector lens 16 coupled to the housing 12. A light shield 18 is positioned within a circular track 20 of the housing 12. The light device 10 may be a headlamp or fog lamp, for example. In addition, the light device 10 may be configured for use with other vehicles as well, such as a motorcycle, scooter, or bicycle.

The housing 12 may comprise a reflective material or a reflective coating such that a light beam emitted from the light source 14 is reflected off the housing 12. For example, the housing 12 may be a projector reflector as found in certain automotive headlamps. In addition, the projector lens 16 may comprise a refractive material or refractive optics that directs a light beam emitted from the light source 14 in a desired direction. The light source 14 may be mounted within an aperture of the housing 12 at a first focal point (F1) of the housing 12. The light source 14 may comprise a typical light bulb sufficient to meet automotive or other vehicle light output requirements. For example, the light source 14 may be a tungsten halogen bulb.

The light shield 18 may be metal or high-heat plastic material with an opaque and a non-reflective finish or feature. Light shield 18 may be configured such that a top edge 18a is generally flat so that it matches a fog lamp beam pattern top edge. Alternatively, it may be configured flat or configured in an alternative shape so that it matches a headlamp beam pattern top edge. The outer edge of the light shield (18b) is preferably circular with a radius that generally matches a radius of the track 20. However, other alternative arrangements may also be used. In this manner, the light shield 18 can freely rotate around an axis 24.

The light shield 18 is mounted within the track 20 of the housing 12 and is secured to the housing 12 at a pivot point 22 of an axis 24. The light shield 18 is designed such that the light shield's center of gravity is located below the pivot point 22 or rotational center. Therefore, pivot point 22 or rotational center, such that the light shield 18 functions similar to a pendulum, in which its top edge maintains a horizontal position as the light device rotates along the axis 24. Because the center of the gravity of the light shield 18 resides generally below its rotational axis 24 or its pivot point 22, gravitational force $g_c$ will tend to pull the light shield 18 in a downward direction. As a result, the light shield 18 rotates along the axis 24 while being held by the circular track 20. The light shield 18 will also be set in the position so that its top edge 18a resides along the top of the device so as to form a desired beam cutoff. A light shield bottom portion 26 may comprise an additional mass, or gravity member, such that the light shield 18 functions similar to a pendulum.

The track 20 of the housing 12 is configured to be at a second focal point (F2) of the housing 12, such that the light shield 18 is positioned at this second focal point. Therefore, a light beam 30 emitted from the light source 14 contacts the housing 12 and converges as ray 31 toward the second focus (F2). Some portion of this emitted light will be blocked by the light shield 18. Light beams that are not blocked by the light shield 18 propagate through the lens 16 to form a desired headlamp or fog lamp beam pattern depending on the top edge of the light shield 18-a.

Since the light shield 18 is pivotally coupled to the housing 12, the light shield 18 is freely-rotational. Thus, gravitational force directs the light shield 18 according to movement of the vehicle in which the light device 10 is contained. As one example, gravitational force may direct the light shield 18 so that a light beam emitted from the light source 14 is aimed horizontally. The light shield 18 performs as a freely-rotational light shield. Thus, the light device 10 is a self-aiming device that conforms a light output to a vehicle's current movement.

Figure 2:
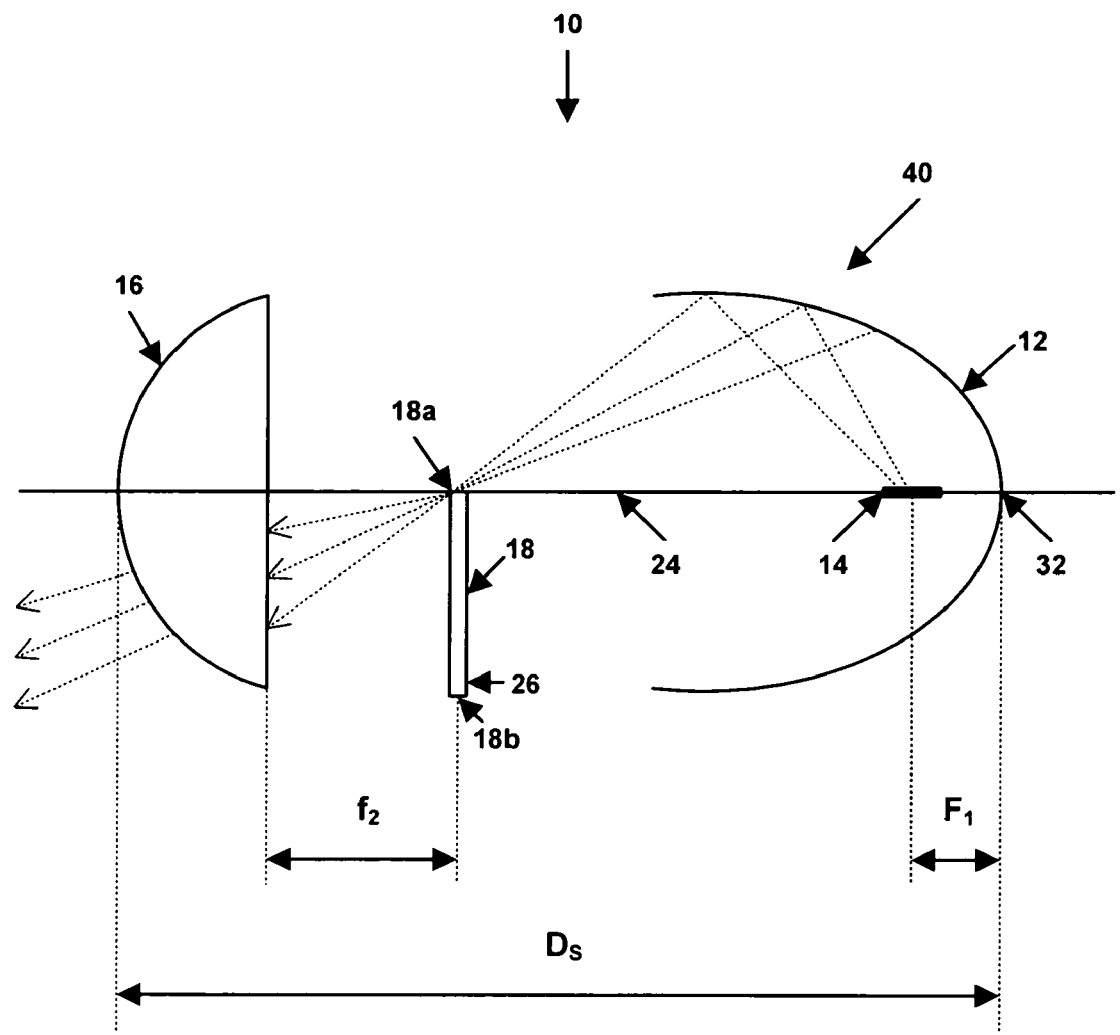
FIG. 2 illustrates an example of a light distribution of a light device.

FIG. 2 illustrates an example of a light distribution pattern 40 of the light device 10. As shown, the light source 14 is positioned at the first focal point (F1) of the housing 12, the light shield 18 is positioned at the second focal point (F2) of the housing 12 and the projector lens 16 is positioned a distance $D_S$ away from one end 32 of the housing 12. Light that is not intercepted by the light shield 18 passes through the projector lens 16.

Figure 3A:
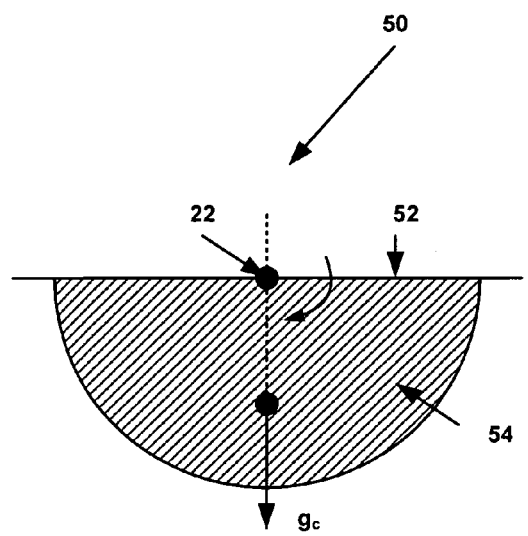
FIG. 3(a) is a front view of one embodiment of a light device.
Figure 3B:
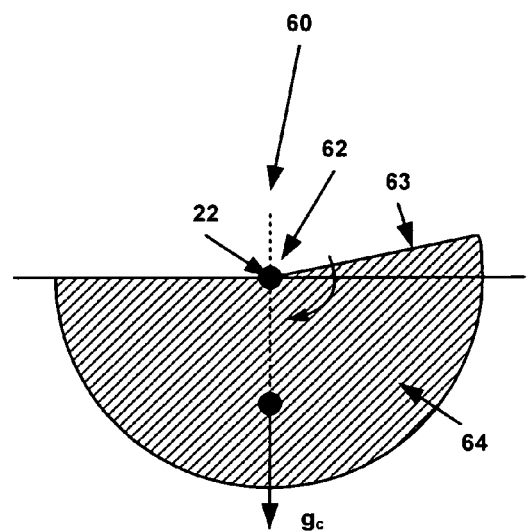
FIG. 3(b) is a front view of another embodiment of a light device.

FIG. 3(a) is a front view of a light shield 18 of the light device 10. FIG. 3(a) illustrates the light device 10 as a fog lamp. Light shield 18 has a generally flat top edge 52 and a generally circular outer edge 54. FIG. 3(b) is a front view of an alternative light shield 60 of another embodiment of the light device 10, e.g., a headlamp. Light shield 60 has a generally flat surface 62 with a slanted portion 63. Light shield 60 also includes a generally circular outer edge 64. For example, FIG. 4(a) illustrates a light distribution pattern 70 for the shield illustrated in FIG. 3(a). FIG. 4(b) illustrates a light distribution pattern 80 for the shield illustrated in FIG. 3(b). Because a center of gravity of the light shield 18 is designed to be below its rotational axis 24 or below its pivot point 22, the gravitational force will tend to pull the light shield 18 downward. As a result, the light shield 18 rotates along the axis 14 while being held by the circular track 20 (FIG. 1), and set in the position so that its top edge 18a will remain on the top to form the desired beam pattern cutoff.

Figure 5:
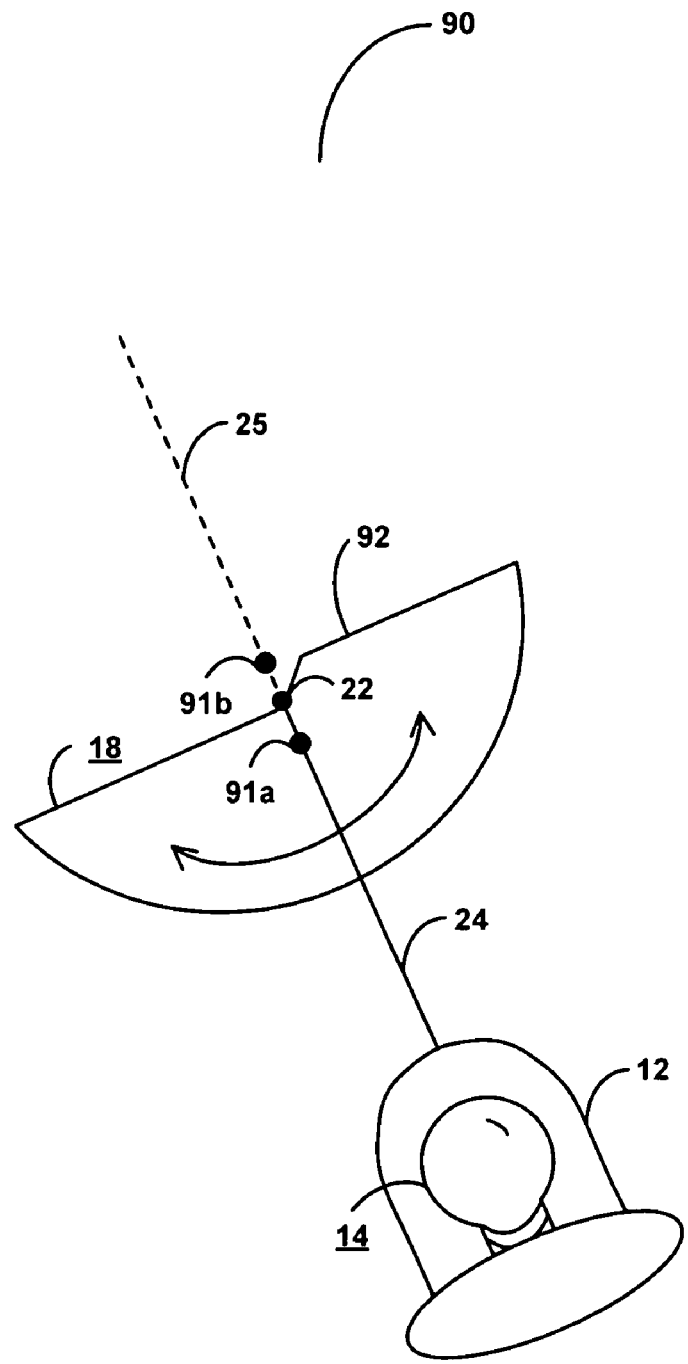
FIG. 5 is a perspective view of one embodiment of the light device.

FIG. 5 illustrates another alternative embodiment of a light device 90. The top edge of the light shield shown here is the same as 18 for forming the beam pattern cutoff. Instead of using a track, a beam 25 is horizontally located along the axis 24 of the housing 12. In one arrangement, beam 25 may be mounted near the bulb 14, and can be mounted similarly to a typical bulb shield. The light shield is provided with an aperture near or at its rotational center or pivot point. The light beam is positioned on the beam via the aperture so that the light shield 18 may freely rotate around the axis 24. In an alternative arrangement, mechanical stops 91a and 91b may be provided along beam 25, preferably on each side of the shield 18. Stops 91a, 91b prevent the light shield 18 from sliding laterally along the beam 24. The light shield 18 will behave similar to a pendulum while the shield's top edge 92 remains horizontal to insure the self aim of device 90.

While the embodiments shown in the drawings relate to a headlight for use in an automobile, the light device of the present invention may be configured for use with other types of vehicles, such as motorcycles, scooters, or bicycles, for example.

As one example, given that motorcycles, scooters, and bicycles lean to turn, a headlight mounted on these vehicles tends to have an aim that becomes obscured and inadequate around curves. The effect of this light distribution can present a safety hazard to vehicle operators, especially at night. In the exemplary embodiment, the light shield 18 senses the vehicle's dynamic behavior, i.e., due to the change in gravitational force experienced by the light shield 18, and will tend to aim the light distribution pattern of device 10 to effectively illuminate the roadway. The light shield 18 corrects the light beam aim efficiently and accurately along a horizontal axis due to the gravitational force.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A light device comprising:
    a housing having a circular sliding track;
    a light source positioned within the housing; and
    a light shield pivotally positioned within the housing and mounted within the circular sliding track such that gravitational force directs the light shield so that a light beam emitted from the light source is horizontally aimed by the light shield.

2. The light device of claim 1, wherein the light shield is positioned near a second focal point of the housing.

3. The light device of claim 1, wherein the light shield has a center of gravity located below a pivot point at which the light shield is pivotally positioned.

4. The light device of claim 3, wherein the light shield comprises a first end and a second end, wherein the first end is pivotally coupled to the pivot point and wherein the second end is a gravity member located below the pivot point.

5. The light device of claim 4, wherein gravitational force directs the gravity member of the light shield downward so that the light beam from the light source is horizontally aimed.

6. The light device of claim 4, wherein the gravity member is rotated about the pivot point due to gravitational force.

7. The light device of claim 1, wherein the vehicle light device is selected from the group consisting of a fog lamp and a headlamp.

8. An vehicle headlamp comprising:
a housing having a circular sliding track;
a light source coupled to the housing; and
a rotating light shield coupled to the housing and mounted within the circular sliding track, wherein light beams emitted by the light source are self-aimed by the light shield due to movement of the light shield by a gravitational force.

9. The headlamp of claim 7, wherein the rotating light shield is pivotally coupled to the housing.

10. The headlamp of claim 8, wherein the light shield is coupled to the housing such that a center of gravity of the freely-rotational light shield is located below a pivot point of the light shield.

11. The headlamp of claim 8, wherein the gravitational force pulls the light shield downward so that a light beam emitted from the light source is horizontally aimed.

* * * * *